United States Patent [19]

Walon

[11] 4,217,414

[45] Aug. 12, 1980

[54] PROCESS FOR SEPARATING AND RECOVERING VITAL WHEAT GLUTEN FROM WHEAT FLOUR AND THE LIKE

[75] Inventor: Raoul G. P. Walon, Brussels, Belgium

[73] Assignee: CPC International Inc., Englewood Cliffs, N.J.

[21] Appl. No.: 922,910

[22] Filed: Jul. 10, 1978

Related U.S. Application Data

[63] Continuation-in-part of Ser. No. 802,860, Jun. 2, 1977, abandoned, which is a continuation of Ser. No. 737,248, Nov. 1, 1976, abandoned.

[30] Foreign Application Priority Data

Oct. 28, 1977 [BE] Belgium ............................... 860225

[51] Int. Cl.$^2$ ...................... C12P 19/22; C12P 19/20; C12P 19/14; C07G 7/00
[52] U.S. Cl. ........................................ 435/95; 435/96; 435/99; 435/272
[58] Field of Search ...................... 195/4, 7, 11, 31 R, 195/62, 66 R; 426/7, 18, 42, 44, 48, 52, 656, 658, 661; 260/112 G; 435/95, 96, 99, 272, 274

[56] References Cited

U.S. PATENT DOCUMENTS

| | | | |
|---|---|---|---|
| 3,337,414 | 8/1967 | Wilson | 195/31 R |
| 3,782,964 | 1/1974 | Knight | 195/4 X |
| 3,922,199 | 11/1975 | Hebeda et al. | 195/31 R |
| 3,951,938 | 4/1976 | Kerkkonen et al. | 260/112 G |

*Primary Examiner*—Thomas G. Wiseman
*Attorney, Agent, or Firm*—Stanley M. Parmerter

[57] ABSTRACT

A mixture of vital wheat gluten and starch containing at least 25% protein, e.g. a protein-rich fraction of wheat flour, is treated with a bacterial alpha-amylase (preferably substantially free of protease) under conditions which solubilize the starch but do not unduly solubilize, or denature, the vital gluten. Specifically, the temperature should be not above about 80° C. and the time of treatment should not exceed about 6 hours. After the enzymatic treament the gluten, which still retains its vital properties, is separated out, and the solubilized starch fraction is recovered or subjected to further processing.

16 Claims, No Drawings

PROCESS FOR SEPARATING AND RECOVERING VITAL WHEAT GLUTEN FROM WHEAT FLOUR AND THE LIKE

This is a continuation-in-part of application Ser. No. 802,860, filed on June 2, 1977, abandoned, itself a continuation of Ser. No. 737,248, filed on Nov. 1, 1976, abandoned.

This invention relates to a process for treating a mixture of vital wheat gluten and wheat starch, e.g. wheat flour, in order to obtain the wheat gluten in vital, undenatured form and as a second product, a solubilized starch which may be used as is or further treated by saccharification.

It is known that wheat gluten will lose its "vital" properties if subjected to high temperatures, and it is also known that wheat gluten has a tendency to solubilize if it is in contact with warm water for an extended period of time. For these reasons, the application to wheat flour of a conventional enzymatic solubilization process, (i.e. gelatinizing, liquefying, and solubilizing the starch portion of the flour with heat and a liquefying enzyme such as alpha-amylase) will result in denaturation, as well as substantial solubilization, of the gluten. Furthermore, if the solubilized starch is saccharified with a saccharifying enzyme to produce a starch hydrolyzate, the resulting hydrolyzate will contain a large amount of solubilized gluten, and this will make ultimate refining (and particularly decolorizing) difficult and impractical.

Conventional processes for enzymatically solubilizing starch or starch-containing materials such as flours, meals, "grits", or the like involve gelatinization of the starch, by heating an aqueous slurry of same, either before addition of the enzyme or, if a thermostable alpha-amylase is used, in the presence of the enzyme. These processes employ high temperatures, and if applied to a material containing vital wheat gluten, will denature the gluten. It has long been known that alpha-amylases are capable of solubilizing starch under non-gelatinizing conditions, but the early prior art processes have never been practiced commercially. Wallerstein et al, in U.S. Pat. No. 2,583,451, disclose a process for converting pure starch to dextrose with alpha-amylase under non-gelatinizing conditions; in this process the temperature does not exceed 45° C., the treatment times are 48–72 hours, and the yields are very low; the process would be unsuitable for use with a gluten-containing starch product.

Recently processes have been developed for effectively hydrolyzing granular starch without the conventional gelatinization step, whereby during the hydrolysis the residual starch retains its granular form. See, for example U.S. Pat. Nos. 3,922,196 and 3,922,197 to Leach et al., 3,922,198 to Kuske et al., U.S. Pat. No. 3,922,199 to Hebeda et al., and U.S. Pat. No. 3,922,200 to Walon et al. These processes are extremely effective in hydrolyzing starch and starch-containing materials, but the conditions are such that, if applied to wheat flour, excessive solubilization and denaturation of the vital gluten will take place.

It is an object of the invention to devise a process for treating wheat flour or similar products in order to obtain therefrom starch, vital gluten, and a starch hydrolyzate. A further object of the invention is to devise a process for the enzymatic solubilization, plus enzymatic saccharification if desired, of the starch portion of a gluten-rich fraction of wheat flour, or other mixture of vital wheat gluten and starch, in such a way that the gluten can be recovered in undenatured, vital form, and the solubilized (or saccharified) starch will contain virtually no solubilized gluten, and therefore can be refined by conventional and economic means.

In accordance with the process of the invention, a mixture of vital wheat gluten and starch is treated, in aqueous suspension, with a bacterial alpha-amylase under conditions whereby the starch is solubilized without gelatinization. That is to say, during the solubilization the residual starch is maintained in granular, i.e. ungelatinized form. After solubilization of the starch the gluten, which is still in vital and undenatured form, can readily be recovered by conventional means such as filtration, decantation, centrifugation or using hydroclones. The solubilized starch solution can then be concentrated and/or dried, further treated with additional enzymes to form saccharified products, or, as will be described later, used as a substrate for hydrolysis of additional starch. The specific conditions will now be described.

Although the invention can be practiced with any mixture of starch and vital wheat gluten the most obvious, and practical, starting material is wheat flour; therefore the invention will be described hereinafter as applied to wheat flour. The material to be subjected to the enzymatic solubilization should contain at least about 25% protein (by weight, dry basis), a range of from 25% to 80% protein being suitable. If the starting material contains less than 25% protein, with the balance being principally starch, unacceptable solubilization of the protein will occur due to the conditions of the reaction being employed, i.e. the ratio of water to protein and the time and temperature of the reaction.

Therefore, normal wheat flour ordinarily requires gluten supplementation or starch fractionation to produce a suitable starting mixture having such a protein content. The initial fractionation or supplementation of the flour can be performed in any way, the only requirement being that the gluten is not denatured.

In an embodiment particularly compatible with the present invention, suitable mixtures of starch and wheat gluten are obtained by subjecting an aqueous slurry of wheat flour to centrifugal decantation. In such a starch fractionation, flour and water may be agitated to form a slurry which, under centrifugal force, is separated into two aqueous fractions. The first of these fractions is normally termed the "underflow" and consists essentially of starch. The second or "overflow" fraction contains a correspondingly enhanced protein content of at least 25% (preferably 30–40%) gluten. This fractionation technique may also be performed serially with, for example, recycle of underflow slurry to a preceding decantation stage.

Conventional centrifugal separations of the foregoing nature facilitate treatment of large amounts of flour. In addition, they enhance the purity of the starch in the underflow. This makes them desirable as sources of starch-gluten mixtures and of relatively pure starch, both of which are useful in stages of the present invention.

While fractionation of wheat flour to increase protein content is a preferred method of producing gluten-starch mixtures useful in accordance with the present invention, it often suffers from one drawback. Where flour is maintained in an aqueous medium for any substantial period of time (as may occur in such a decantation), a significant amount of solubles—most undesirably, protein solubles—may form. This is so even where, as preferred, the conditions of temperature, pH and particularly time are maintained so as to minimize solubility. As a result, it is further preferred to pre-treat mixtures of vital wheat gluten and starch which are in aqueous dispersion immediately prior to the alpha-amylase solubilization step.

This pre-treatment of an aqueous slurry of the mixture involves the separation of solubles which may have formed during, for example, centrifugal decantation of flour to elevate the protein content of the mixture. Solubles removal may be accomplished through a wide range of convention means including severe centrifugal decantation of the aqueous dispersion, with or without addition of washer-replacement water. While ensuring, and in some cases even enhancing, the purity of the eventual vital gluten product, this pre-treatment also yields a purer alpha-amylase hydrolyzed starch by-product. This latter improvement is particularly advantageous because it significantly reduces potential problems incident to subsequent refining of the starch for removal of included protein.

Once a suitable vital wheat gluten and starch mixture has been obtained, it is if necessary combined with water (preferably in an amount sufficient to form a slurry having a solids content of 10–35% by weight) and a bacterial alpha-amylase which is preferably substantially free of protease. The enzyme, under conditions of appropriate pH for activity, is then permitted to react with the starch portion of the mixture at a temperature and for a short time sufficient to solubilize starch (preferably at least 50% of that in the mixture) without effecting substantial reduction of gluten vitality. These time and temperature conditions are interdependent in that, for example, longer times permit lower temperatures and higher temperatures may require shorter times for achievement of a desired degree of starch solubilization while retaining gluten vitality. In general, however, the period of time of reaction should not exceed about 6 hours and may be as low as a few minutes. Correspondingly, the temperature should be not greater than about 80° C. (desirably, not greater than 60° C. and most preferably in the range of 45° and 60° C.).

By means of this process substantially all (or as much as desired) of the starch is completely solubilized, the gluten is not denatured, and substantially no solubilization of the gluten occurs. Therefore one can easily recover the still vital gluten, plus the solubilized starch which contains a minimum amount of solubilized protein. The solubilized starch may be concentrated and/or dried and used "as is", or subjected to any conventional saccharification process.

The bacterial alpha-amylase preferably is one which is active within the pH range of from about 4.0 to 7.0 and which possesses appreciable activity at relatively low temperatures, i.e. 60° C. and below. Preferred sources of such alpha-amylases include certain species of the *Bacillus* microorganism, viz., *B. subtilis, B. licheniformis, B. coagulans* and *B. amyloliquefaciens.* Suitable alpha-amylases are described in Austrian patent application No. 4836/70 and in U.S. Pat. No. 3,697,378. Especially suitable amylases are those derived from *B. licheniformis,* as described in the Austrian application. Particularly preferred is that alpha-amylase derived from *B. licheniformis* strain NCIB 8061, NCIB 8059, ATCC 6598, ATCC 6634, ATCC 8480, ATCC 9945A and ATCC 11945. They are unusually effective in the liquefaction of granular starch. One such enzyme is identified by the trade name "Thermamyl", available from NOVO Enzyme Corporation, Mamaroneck, N.Y. Thermamyl is characterized by the following properties:

(a) it is thermally stable;

(b) it is active throughout a wide range of pH; and (c) its activity and heat stability are less dependent than other alpha-amylases on the presence of added calcium ion.

Typical analyses of three different Thermamyl preparations are as follows:

|  | Thermamyl 60 | Thermamyl 120 | Thermamyl |
|---|---|---|---|
| Dry substance, % | 35.4 | 98.8 | 94.6 |
| Alpha-amylase activity U/g (as is) | 1,156.0 | 2,105.0 | 9,124.0 |
| Protein, % d.b. | 26.5 | 21.2 | 21.2 |
| Ash, % d.b. | 60.1 | 91.2 | 64.4 |
| Calcium, % d.b. | 0.04 | 0.72 | 4.9 |
| Sodium, % d.b. | 12.3 | 12.2 | — |

Still other suitable alpha-amylases which are available include the following:

TABLE I

| Enzyme Preparation | Company | Form | Activity |
|---|---|---|---|
| Rhozyme H-39 | Rohm & Haas | Powder | 4,874 U/g |
| Takamine HT-1000 | Miles | Powder | 3,760 U/g |
| Tenase | Miles | Liquid | 2,043 U/ml |
| Dex-Lo MM | Wallerstein | Liquid | 1,213 U/ml |
| Novo SP-96 | Novo | Powder | 7,310 U/g |
| Novo *B. subtilis* | Novo | Liquid | 1,599 U/ml |
| Kleistase GM-16 | Daiwa Kasai | Powder | 26,593 U/g |
| Kleistase L-1 | Daiwa Kasai | Liquid | 1,918 U/ml |
| Rapidase SP-250 | Société "Rapidase" France | Powder | 11,655 U/g |
| Maxamyl LX6000 | Gist-Brocades | Liquid | 13,300 U/ml |

The alpha-amylase should be substantially free of protease activity, in order to avoid excessive solubilization of the gluten; because virtually all commercially available alpha-amylase preparations contain protease activity, it is necessary first to treat the preparation to render it substantially protease-free. This can readily be accomplished with the Thermamyl preparations by heating an aqueous slurry of the enzyme preparation at 70° C. to 80° C. for from 30 to 45 minutes.

The amount of alpha-amylase employed must, of course, be sufficient at least to solubilize substantially all of the starch present, i.e. at least about 0.1 activity unit per gram of starch. (The alpha-amylase activity as used herein is determined by the method set forth in U.S. Pat. No. 3,922,196 to Leach et al.) It is preferred, however, to employ more than the minimum amount of alpha-amylase, for two reasons. First of all, an excess amount of enzyme will accelerate the solubilization process, thereby minimizing the time during which the gluten is subjected to the process conditions with attendant minimal gluten solubilization. A second, and extremely important advantage from the economic standpoint, is that after separation of the gluten fraction, the solubilized starch, which is present in the form of a dilute solution which contains still active alpha-amylase, may be used directly as a medium for solubilizing additional starch merely by adding fresh raw starch to it and adjusting the conditions, if necessary, for optimal solubilization of the fresh starch. After solubilization of the additional starch the product may, of course, be subject to saccharification with the appropriate enzyme, e.g. glucoamylase to produce dextrose or dextrose-containing hydrolyzates, beta-amylase (with or without a debranching enzyme, e.g., alpha, 1-6 glucosidase) to produce maltose syrups, etc. If it is planned ultimately to employ a saccharifying enzyme at any stage of the process, it is advantageous to add it, or at least a portion of it, directly to the initial flour fraction along with the bacterial alpha-amylase. The presence of a saccharifying enzyme in conjunction with the alpha-amylase acts to accelerate further the solubilization step, with all attendant advantages of such acceleration.

As will be shown in the examples, an extremely practical system can be developed, based on the process of the invention, for instance by centrifugal decantation, to obtain a starch fraction and a gluten-rich fraction, then adding to the gluten-rich fraction bacterial alpha-amylase in an amount sufficient to solubilize not only the starch portion of that fraction but also the starch obtained in the separation step, also adding one or more saccharifying enzymes if desired, then subjecting the gluten-rich fraction to the process of the invention, recovering the vital gluten, and then adding the starch from the separation step to the solubilized starch, which is in the form of a dilute aqueous solution containing active alpha-amylase, solubilizing the fresh starch, saccharifying if desired, and finally refining the hydrolyzate by conventional means. This system can be designed so as to be completely "bottled up", virtually eliminating waste water disposal problems.

The pH of the solubilization process is governed, of course, by the operable range of the alpha-amylase used, and the use of the optimum pH of the enzyme is preferred. Most alpha-amylases exhibit their optimum activity at about pH 6 (the optimum for Thermamyl is pH 5-7, for Rapidase, pH 6, etc.). Saccharifying enzymes usually exhibit optimum activity at lower pH's (pH 4.0-4.5 for gluco-amylases, e.g.). Therefore if a saccharifying enzyme is employed in conjunction with the alpha-amylase during the solubilization, it may be desirable to employ a "compromise pH"; the skilled operator can readily determine the preferred pH for his particular operation.

The time of the solubilization must, of course, be sufficient to reach the desired degree of starch solubilization but should be as short as possible in order to avoid excessive solubilization of the gluten. The time necessary will depend upon various factors, e.g. amount of starch to be solubilized, amount and type of alpha-amylase employed, presence or absence of a saccharifying enzyme, solids concentration, and temperature. A time period greater than 6 hours should be avoided, because this results in an unacceptable amount of gluten solubilization, which reduces the yield of vital gluten and introduces so much color into the solubilized starch solution to render ultimate refining difficult and costly. Under most conditions the solubilization can be completed in less than 3 hours, commonly 1 to 3 hours, and this is the preferred time period.

The preferred temperature of the solubilization is about 60° C., but can be as low as 45° C.; lower temperatures prolong the time and should be avoided. A temperature much above 60° C. causes denaturization of the gluten if maintained for any substantial period of time, although temperatures between 60° and 80° C. may be employed if limited to less than about 30, preferably less than 15, minutes.

The alpha-amylase-containing slurry can be brought to solubilization temperature in any conventional manner. A too rapid rise from 50° C. to the final temperature may cause some denaturization of the gluten and this is undesirable. A temperature rise from 50° C. to 60° C. over a period of 10 minutes, however, is quite satisfactory and retains gluten vitality.

The following examples will serve to illustrate the practice of the invention. In the examples the Thermamyl 60 alpha-amylase preparation was rendered substantially protease-free by heating the liquid preparation, as delivered, for 30 to 45 minutes at 80° C. This treatment resulted in complete inactivation of the protease without substantial loss of alpha-amylase activity. The Maxamyl LX6000 was treated by first dissolving the liquid enzyme preparation, as delivered, in a low D.E. starch hydrolyzate solution (30% dry substance) which contained added calcium, and heating for 30 minutes at 75° C. This treatment destroyed substantially all of the protease and left 90% of the alpha-amylase activity.

All percentages in the examples and in the appended claims are by weight, unless otherwise stated.

EXAMPLE I

This example illustrates the solubilization of a gluten-rich fraction of wheat flour with both alpha-amylase and a saccharifying enzyme (beta-amylase), and the ultimate preparation of a high-maltose syrup in addition to the recovery of a vital gluten product.

1000 kg. of soft wheat flour (88.6% dry substance and containing 10.2% protein, 76.5% starch, 1.8% fat and about 0.4% each ash and fiber) was suspended in 2000 kg. water and the suspension sieved to eliminate some of the coarse fiber. The suspension was agitated to maintain the protein and starch components in an homogeneous state, i.e. to prevent the gluten from agglomerating. The suspension was then sent to an Alfa-Laval centrifugal decanter, operating at 2000 r.p.m. rotary speed, and the overflow (protein-rich fraction) and the underflow (starch fraction) were collected. The underflow, which contained about 2.5% protein and some fiber and ash in addition to starch, was then purified and concentrated by first passing it through a series of super centrifugal decanters (2000 r.p.m.) and then a dewatering centrifugal. The filter cake was flash dried to a moisture content of about 13%. The product contained 98.7% wheat starch, 0.6% protein and 0.1% ash.

The overflow fraction had a dry substance content of 12% and contained 29.7% protein (total Kjeldahl), dry basis. The pH was adjusted to 5.5, and 0.4% protease-free bacterial alpha-amylase (Thermamyl 60) and 0.06% beta-amylase (Biozyme M. from Amano Chemicals) were added (percentages by weight, dry basis, based on the dry total weight.) 200 p.p.m. $CaCl_2$ was also added, and the temperature was raised to 57° C. and held for two hours. At the end of that time 98.3% of the starch was solubilized.

The product was passed through a Sharples centrifugal, operating at 12,000 r.p.m. and the underflow (gluten fraction) and the overflow (soluble starch fraction) were collected.

The underflow had a dry substance of 35.6% and contained 68.2% protein dry basis. It was spray-dried to a moisture content of 5.3% under the following conditions:

| | |
|---|---|
| concentration feed | 35.6% |
| temperature feed | 45° C. |
| inlet temperature | 161° C. |
| outlet temperature | 88° C. |

The gluten portion (68%) of the resulting dry product had retained its original insolubility.

The overflow consisted of a dilute (7.6% d.s.) solubilized starch solution containing alpha-amylase; the alpha-amylase still retained 90% of its original activity. This solution was enriched with the previously recovered and dried wheat starch to a dry substance of 30%. The pH was adjusted to 6.0, the temperature was raised to 95° C., and the slurry was held until the starch was liquefied.

The temperature was then lowered to 58° C., the pH adjusted to 5.0, and beta-amylase was added in an amount of 0.05% by weight (based on dry substance). The starch was saccharified under those conditions for 12 hours, after which the product was refined with (a) 0.5% spent carbon, (b) a strong cation exchange resin, (c) sulfonated coal ("Dusarit" from Imacti), and (d) a weak anion exchange resin. The product was concentrated and passed on 0.5% virgin carbon. The clear, water-white product had a D.E. of 43.7, a dextrose content of 3%, a maltose content of 55%, and 42% tri-and higher saccharides.

EXAMPLE II

An aqueous slurry of soft wheat flour was prepared as in Example I, and sent to an Alfa-Laval centrifugal decanter. The centrifugal decanter was operated in such a manner as to produce an overflow of 12.8% dry substance containing 32.6% protein, dry basis.

The underflow (starch fraction) was collected and processed as in Example I.

The overflow was collected and divided into three portions, designated as A, B, and C, which were then treated as follows.

A.

Production of a Malto-Dextrin—Use of Alpha-Amylase Alone for Solubilization.

The temperature was brought to 60° C., the pH was adjusted to 6.0, and Thermamyl 60 alpha-amylase (protease-free) was added in an amount of 0.3% by weight based on the dry total weight. After a reaction time of 2 hours 97.6% of the starch had been solubilized.

The product was centrifuged in a Sharples centrifugal (12,000 r.p.m.) and the underflow, which had a dry substance of 36.7% and which contained 72% vital gluten (dry basis) was spray dried as in Example I.

The overflow, which had a d.s. of 7.6% and which still contained 90% active alpha-amylase was enriched with fresh starch to a dry substance content of 30%. The pH was adjusted to 6.0 and the temperature brought to 94° C. After 2 hours reaction time the temperature was raised to 125° C. to inactivate the enzyme, after which the product, which was a starch-free soluble malto-dextrin having a D.E. of 18.6, was refined and spray-dried by conventional means.

B.

Production of Dextrose—Use of Alpha-Amylase and Glucoamylase for Solubilization.

The pH was adjusted to 5.5 and Thermamyl 60 (0.25%) and glucoamylase (0.06%) enzymes (percentages on total dry weight) were added. The temperature was brought to 60° C. and held for 90 minutes.

The product was centrifuged as in A, after which the underflow was centrifuged a second time in order to eliminate additional soluble starch and obtain a fraction higher in vital gluten. The underflow from the second centrifuge, which contained 78% vital gluten, was spray dried as in Example I.

The overflows from both centrifugals were combined. The alpha-amylase activity in this fraction was 90% of the original, but very little glucoamylase activity remained. Fresh starch was added to a dry substance content of 28.6%, the pH was adjusted to 6.0, and the temperature was brought to 95° C. and held until the starch was fully liquefied.

The temperature was lowered to 55° C., the pH adjusted to 4.2 and 0.04% glucoamylase was added. After 33 hours saccharification time the product had a D.E. of 97.6 and contained 94.8% dextrose. It was refined, crystallized and dried in a conventional manner to a 99.6% dextrose product.

C.

Production of Dextrose—Use of Alpha-Amylase Alone for Solubilization

This portion was treated with alpha-amylase as was portion A, including centrifuging and treating of the underflow containing 72% vital gluten.

To the overflow (which still retained 90% alpha-amylase) was added fresh starch to a dry substance of 28.6%, and the temperature was raised to 95° C. and held until the starch was liquefied. It was then cooled to 55° C., and the pH adjusted to 4.8, glucoamylase was added in an amount of 0.7%, and the product was saccharified to dextrose as in B.

EXAMPLE III

In this example three separate trials were conducted, desiqnated as A, B and C. In each trial wheat flour containing 11% protein was suspended in water and fractionated as in the previous examples by means of an Alfa-Laval centrifugal decanter to obtain (1) an underflow (starch) fraction which was recovered as in the previous examples and (2) an overflow (protein-rich fraction) having the following composition:

| | |
|---|---|
| Total weight | 1777.5 kg. |
| % dry substance | 16 |
| Weight, dry substance | 284.4 kg. |
| % protein, d.b. | 33.65 |
| Weight, protein | 95.7 kg. |

Each protein-rich fraction was treated with a bacterial alpha-amylase at pH 6 and 60° C. for 4 hours, the difference between the runs being in the enzyme preparations employed as follows. A: Maxamyl LX 6000, derived from *Bacillus subtilis,* treated to render it substantially free of protease, was added in an amount of 0.25% based on total dry weight. B: Thermamyl 60 (protease-free) was added in amount of 0.5%. C: Thermamyl 60, not treated to render it substantially protease-free, was added in an amount of 0.5%.

After treatment each product was separated by means of a Toniatti centrifugal operating at 25,000 r.p.m. The respective underflow (vital gluten) and overflow (soluble starch) fractions had the compositions set forth in Table II.

TABLE II

|  | A | B | C |
|---|---|---|---|
| Underflow (vital gluten fraction): | | | |
| Total weight | 578.3 kg | 561.5 kg | 467.3 kg |
| % dry substance | 26.8% | 23.4% | 27.6% |
| Weight d.s. | 155 kg | 131 kg | 129 kg |
| % protein d.b. | 55% | 65% | 53.7% |
| Weight protein | 85.25 kg | 85.15 kg | 69.27 kg |
| Overflow (soluble starch fraction): | | | |
| Total weight | 1431.7 kg | 1448.5 kg | 1542.7 kg |
| % dry substance | 8.9% | 10.5% | 10.1% |
| Weight dry substance | 129.4 kg | 152.1 kg | 155.8 kg |
| % protein | 8.1% | 6.8% | 16.9% |
| Weight protein | 10.3 kg | 10.3 kg | 26.3 kg |

The foregoing values illustrate the desirability of employing an alpha-amylase which is substantially protease-free, in order to minimize solubilization of the gluten.

EXAMPLE IV 2000 kg of soft wheat flour (80.0% starch and 11.2% protein) was suspended in 4740 kg of water and centrifugally decanted as in Example I. The resultant overflow (protein-rich fraction) contained 3340 kg of water and 600 kg of solids including 230 kg starch and 216 kg protein.

This overflow was centrifuged at high speed to remove about 60% of its aqueous content. This free water was found to contain 112 kg of soluble solids of which 34 kg were protein. The remaining portion of the overflow was then treated for enzymatic separation of starch.

Hydrolysis of the starch in the remaining overflow mixture was performed by addition of Thermamyl (which was protease-free). The Thermamyl was added to the mixture at 0.5% by weight as it was passed through a plate heat exchanger and then separated in a continuous centrifuge. In this manner, the mixture was raised to between 70°–75° C. for ten minutes before the gluten was separated, washed and cooled to room temperature.

The liquid recovered after enzymatic hydrolysis contained only 8 kg (3% of total solids) of protein. This decrease in undesirable protein content in the separated starch fraction shows the advantage of removal of solubles from the mixture by the high speed centrifugation step employed in this Example, subsequent to the centrifugal decantation and prior to enzymatic hydrolysis. Moreover, the separated gluten—comprising about 74% protein—was shown by baking tests to have retained in vitality even after its brief elevation during hydrolysis to normally deactivating and denaturing temperatures.

What is claimed is:

1. A process for treating a mixture of vital wheat gluten and wheat starch obtained from wheat flour containing at least 25% protein comprising:
   (a) preparing an aqueous suspension of said mixture;
   (b) subjecting the aqueous suspension to the action of bacterial alpha-amylase is substantially free of protease and is derived from a bacillus microorganism under conditions whereby a substantial amount of said starch is solubilized without undergoing gelatinization, said conditions comprising a temperature of from about 45° to about 80° C., a pH of from about 5 to about 7, and a time of less than 6 hours; and
   (c) separating solid, vital gluten from the solubilized starch.

2. The process of claim 1 wherein the aqueous suspension subjected to the action of alpha-amylase is substantially free of solubles.

3. The process of claim 1 wherein the mixture of vital wheat gluten and wheat starch comprises a protein-rich fraction obtained from wheat flour.

4. The process of claim 3, wherein the protein-rich fraction contains from about 25% to about 80% protein.

5. The process of claim 4, wherein said fraction contains from about 30% to about 40% protein.

6. The process of claim 3 wherein an aqueous slurry of wheat flour is subjected to centrifugal decantation to separate substantially protein-free wheat starch fraction from said protein-rich fraction.

7. The process of claim 6 wherein solubles present in said protein-rich fraction are removed prior to subjecting said fraction to the action of alpha-amylase.

8. The process of claim 1 wherein the alpha-amylase is one derived from a microorganism selected from the group consisting of *Bacillus licheniformis* and *Bacillus subtilis*.

9. The process of claim 7 wherein the conditions of starch solubilization comprise a temperature of from 60° C. to 80° C. for a time of less than 30 minutes.

10. The process of claim 1 wherein the alpha-amylase is added in an amount in excess of the mininum amount necessary to solubilize all of the starch present, and wherein the time of the solubilization does not exceed about 3 hours.

11. The process of claim 10 wherein, following the separation of the vital gluten, the solubilized starch solution contains still active enzymes and is combined with the wheat starch fraction obtained by centrifugal decantation, and the resulting mixture is subjected to a solubilization process.

12. The process of claim 11 wherein the solubilized starch is saccharified with a saccharifying enzyme.

13. The process of claim 12 wherein the saccharifying enzyme is glucoamylase.

14. The process of claim 12 wherein the saccharifying enzyme is a maltogenic enzyme.

15. The process of claim 1 wherein the conditions of starch solubilization comprise a temperature of from 45° to 60° C.

16. The process of claim 1 wherein the conditions of starch solubilization comprise a temperature of from 60° C. to 80° C. for a time of less than 30 minutes.

* * * * *

UNITED STATES PATENT AND TRADEMARK OFFICE
CERTIFICATE OF CORRECTION

PATENT NO. : 4,217,414
DATED : August 12, 1980
INVENTOR(S) : Raoul G. P. Walon

It is certified that error appears in the above-identified patent and that said Letters Patent are hereby corrected as shown below:

Abstract, line 9, "treament" should read --treatment--.

Column 9, line 62, "in" should be --its--.

Claim 1(b), line 7, after "alpha-amylase" insert --which--.

Signed and Sealed this

Twenty-third Day of December 1980

[SEAL]

Attest:

SIDNEY A. DIAMOND

Attesting Officer

Commissioner of Patents and Trademarks